US008335480B2

(12) United States Patent
Na et al.

(10) Patent No.: US 8,335,480 B2
(45) Date of Patent: Dec. 18, 2012

(54) OMNI-DIRECTIONAL AND LOW-CORRELATED PRE-CODING BROADCAST BEAMFORMING

(75) Inventors: Yanxin Na, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 949 days.

(21) Appl. No.: 12/235,139

(22) Filed: Sep. 22, 2008

(65) Prior Publication Data

US 2009/0088090 A1 Apr. 2, 2009

Related U.S. Application Data

(60) Provisional application No. 60/976,402, filed on Sep. 28, 2007.

(51) Int. Cl.
H03C 7/02 (2006.01)
H04B 1/02 (2006.01)
H04B 7/02 (2006.01)

(52) U.S. Cl. ....... 455/101; 455/69; 455/562.1; 370/338; 370/480

(58) Field of Classification Search .......... 455/69, 455/101, 562.1; 370/338, 480, 208; 375/347, 375/349, 316
See application file for complete search history.

(56) References Cited

U.S. PATENT DOCUMENTS

| 7,312,750 | B2 * | 12/2007 | Mao et al. ............. 342/377 |
| 7,995,689 | B2 * | 8/2011 | Park et al. ............. 375/347 |
| 8,040,831 | B2 | 10/2011 | Kurtz et al. |
| 8,195,240 | B2 | 6/2012 | Jin et al. |
| 2005/0163095 | A1 | 7/2005 | Raleigh et al. |
| 2008/0205539 | A1 | 8/2008 | Wang et al. |
| 2008/0261658 | A1 | 10/2008 | Jin et al. |
| 2009/0116569 | A1 | 5/2009 | Jin |
| 2009/0261658 | A1 * | 10/2009 | Kato ............. 307/82 |
| 2010/0150129 | A1 | 6/2010 | Jin et al. |

* cited by examiner

Primary Examiner — Nay A Maung
Assistant Examiner — Chung-Tien Yang
(74) Attorney, Agent, or Firm — Edell, Shapiro & Finnan, LLC

(57) ABSTRACT

Techniques are provided herein to compute beamforming weight vectors for pre-coding broadcast signals. First, system parameters for a device configured to wirelessly transmit one or more broadcast signals via a plurality of antennas are determined. Based on the system parameters a plurality of beamforming weight vectors are computed. The beamforming weight vectors are computed such that they have omni-directional like characteristics and such that correlation between beamforming weight vectors is relatively low. The plurality of beamforming weight vectors are applied to each of the one or more broadcast signals for transmission by the device to produce beamformed transmit signals for transmission via the plurality of antennas.

20 Claims, 6 Drawing Sheets

OMNI-DIRECTIONAL AND LOW-CORRELATED PRE-CODING BROADCAST BEAMFORMING

CROSS REFERENCE TO RELATED APPLICATIONS

This application claims priority to U.S. Provisional Patent Application No. 60/976,402, filed Sep. 28, 2007, the entirety of which is incorporated herein by reference.

TECHNICAL FIELD

The present disclosure relates to wireless communication techniques, and more particularly to beamforming broadcast signals to multiple destination devices.

BACKGROUND

In wireless communication systems, antenna arrays are used at devices on one or both ends of a communication link to suppress multipath fading and interference, and to increase system capacity by supporting multiple co-channel users and/or higher data rate transmissions. For example, in multiple-input multiple-output (MIMO) communications systems, a base station (BS) device and each of a plurality of mobile station (MS) devices are equipped with a plurality of antennas. In addition, the BS device can use an antenna array to beamform signals to a particular destination MS device and in so doing provide higher received signal power and reduced interference from other MS devices.

However, broadcast signals such as preamble data signals or media access protocol (MAP) data signals must be successfully received by all destination devices, including new destination device for which communication has not been previously established. Generally, the BS cannot apply different beamforming weights to beamform the broadcast signals to each of the destination MS devices. Thus, it is difficult to achieve a high average received signal power when broadcasting signals to multiple destination devices subject to overall transmit power limitations at the BS device.

Accordingly, a technique for pre-coding broadcast signals with appropriate beamforming weight vectors is provided that can achieve an omni-directional power distribution across a sector and thereby improve system performance.

DESCRIPTION OF EXAMPLE EMBODIMENTS

Overview

Techniques are provided herein to compute beamforming weight vectors for pre-coding broadcast signals. First, system parameters for a device configured to wirelessly transmit one or more broadcast signals via a plurality of antennas are determined. Based on the system parameters a plurality of beamforming weight vectors are computed. The beamforming weight vectors are computed such that they have omni-directional like characteristics and such that correlation between beamforming weight vectors is relatively low. The plurality of beamforming weight vectors are applied to each of the one or more broadcast signals for transmission by the device to produce beamformed transmit signals for transmission via the plurality of antennas.

The broadcast techniques described herein greatly improve the performance of a wireless communication system or network. In the following description a method is described for pre-coding broadcast signals that are formatted according to orthogonal frequency division multiple access (OFDMA) technology as one example. It should be understood that these techniques can easily be extended to pre-coding broadcast transmission signals in any multi-antenna system, such as in code division multiple access (CDMA) systems or time division multiple access (TDMA) systems.

Figure 1:
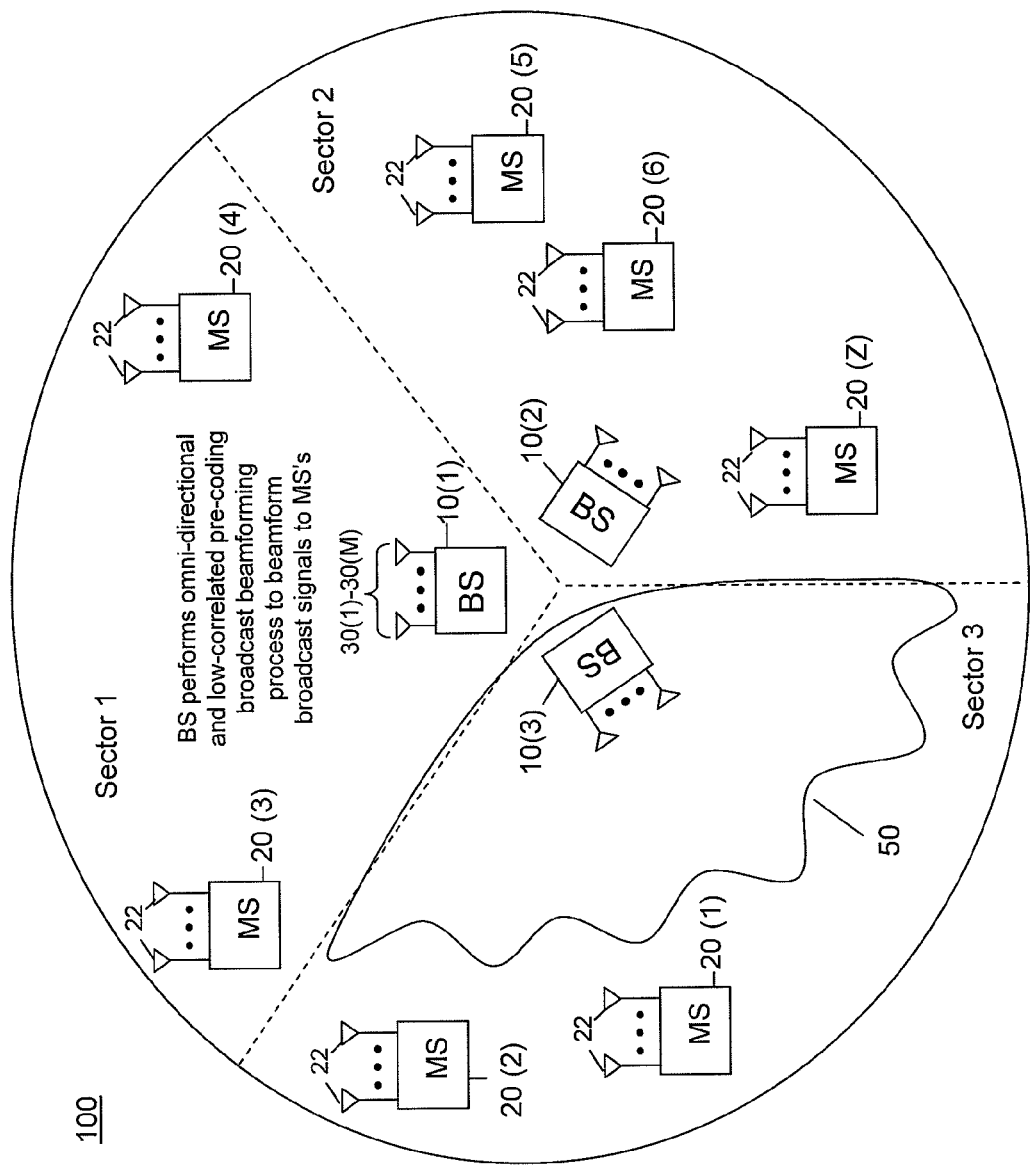
FIG. 1 is an example of a block diagram of a wireless communication system in which a wireless communication device is configured to wirelessly broadcast signals to multiple destination devices according to an omni-directional and low-correlated pre-coding broadcast beamforming process.

Referring first to FIG. 1, a wireless radio communication system or network is shown generally at reference numeral 100 and comprises a plurality of first communication devices, e.g., base stations (BSs) 10(1)-10(3), and a plurality of second communication devices, e.g., mobile stations (MSs) 20(1)-20(Z). The BSs 10(1)-10(3) may connect to other wired data network facilities (not shown) and in that sense serves as a gateway or access point through which the MSs 20(1)-20(Z) have access to those data network facilities.

The BSs 10(1)-10(3) comprise a plurality of antennas 30(1)-30(M). The MSs 20(1)-20(Z) may also each comprise a plurality of antennas shown collectively at reference numeral 22. The BSs 10(1)-10(3) may wirelessly communicate with individual ones of the MSs 20(1)-20(Z) using a wideband wireless communication protocol in which the bandwidth is much larger than the coherent frequency bandwidth. An example of such a wireless communication protocol is the IEEE 802.16 communication standard, also known commercially as WiMAX™. Each MS 20(1)-20(Z) may have a different antenna configuration (e.g., a different number of antennas). The system 100 may employ a single-carrier or a multi-carrier modulation format. One example of a multi-carrier modulation format is orthogonal frequency-division multiplexing/multiple-access (OFDM/OFDMA) technology. Another example of a communication protocol is the IEEE 802.11 standard known commercially as WiFi™.

The transmission space shown in FIG. 1 is divided in to sectors. In this example, three sectors 1-3 of approximately 120 degrees are shown. Each sector in FIG. 1 is served by its own BS, e.g., one of the BSs 10(1)-10(3) respectively. The BSs 10(1)-10(3) perform various forms of pre-coding to be applied to one or more broadcast signal streams to the plurality of MSs 20(1)-20(Z) based on a number of determined system parameters. More specifically, the BSs 10(1)-10(3) perform an omni-directional and low-correlated pre-coding broadcast beamforming process to beamform broadcast signals to multiple MSs. When transmitted, the broadcasted signal streams from each BS 10 form omni-directional radio frequency beam 50, which for simplicity is only shown in sector 3.

Figure 2:
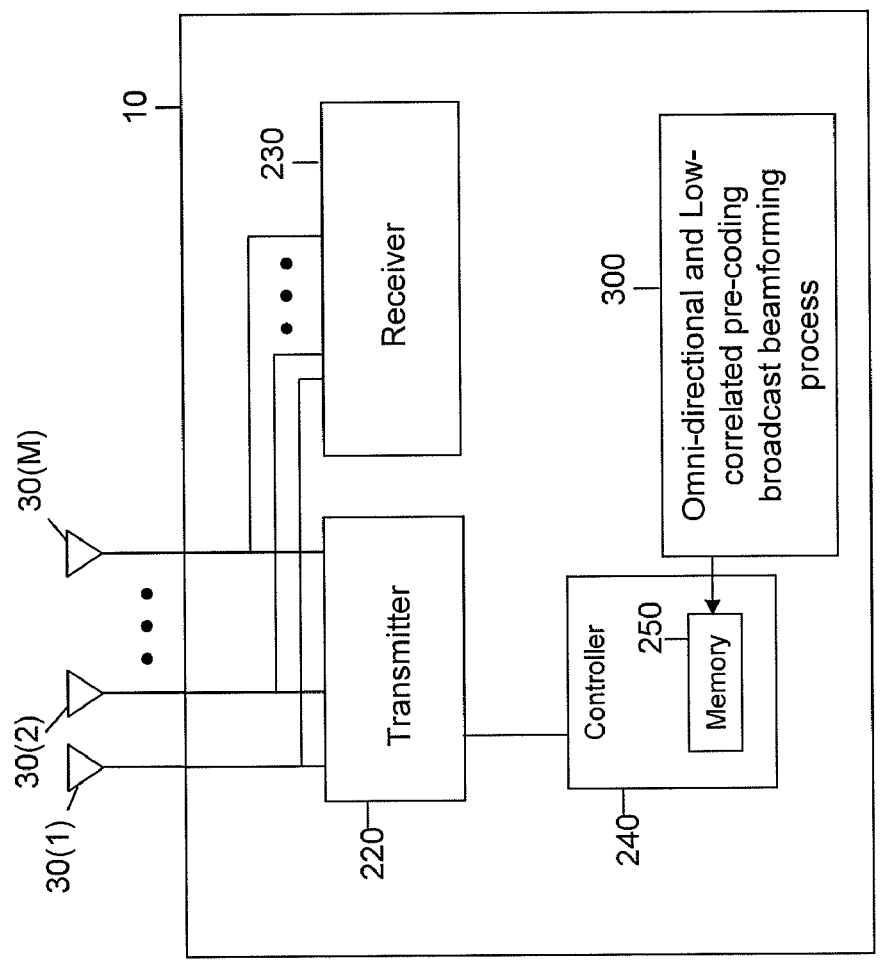
FIG. 2 is an example of a block diagram of a wireless communication device configured to perform the omni-directional and low-correlated pre-coding broadcast beamforming process when broadcasting signals to multiple destination devices.

Turning to FIG. 2, an example block diagram of one BS, referred to generically as BS 10, configured to perform an omni-directional and low-correlated pre-coding broadcast beamforming process is now described. The BS 10 comprises a transmitter 220, a receiver 230 and a controller 240. The controller 240 supplies data, obtained from higher control/transport layers in the device (not shown), to the transmitter 220 to be transmitted and processes signals received by the receiver 230. In addition, the controller 240 performs other transmit and receive control functionality. Part of the functions of the transmitter 220 and receiver 230 may be implemented in a modem and other parts of the transmitter 220 and receiver 230 may be implemented in radio transmitter and radio transceiver circuits. Likewise, the controller 240 may perform functions associated with a modem. It should be understood that there are analog-to-digital converters (ADCs) and digital-to-analog converters (DACs) in the various signal paths to convert between analog and digital signals.

The transmitter 220 comprises individual transmitter circuits that supply respective individual transmit signals to corresponding ones of the antennas 30(1)-30(M) for transmission. The receiver 230 receives the signals detected by each of the antennas 30(1)-30(M) and supplies corresponding antenna-specific receive signals to the controller 240. It is understood that the receiver 230 comprises a plurality of receiver circuits, each for a corresponding one of the antennas 30(1) to 30(M). For simplicity, the individual receiver circuits and individual transmitter circuits are not shown.

The controller 240 comprises a memory 250 or other data storage block that stores data used for the techniques described herein. The memory 250 may be separate or part of the controller 240. Instructions for performing an omni-directional and low-correlated pre-coding broadcast beamforming process 300 may be stored in the memory 250 for execution by the controller 240. The process 300 generates beamforming weight vectors that are applied to one or more broadcast signals to be transmitted in order to generate a plurality of weighted transmit signals that are supplied by the transmitter 220 to corresponding ones of the plurality of antennas 30(1)-30(M) for transmission. The beamforming weight vectors may be applied to contiguous groups of subcarrier signals associated with the one or more broadcast signals as described hereinafter. In addition, the process 300 may be configured to perform a smoothing operation at the boundaries of groups of contiguous subcarriers so that there are no large discontinuities in the magnitude of signals from one subcarrier group to another.

The functions of the controller 240 may be implemented by logic encoded in one or more tangible media (e.g., embedded logic such as an application specific integrated circuit, digital signal processor instructions, software that is executed by a processor, etc.), wherein the memory 250 stores data used for the computations described herein (and/or to store software or processor instructions that are executed to carry out the computations described herein). Thus, the process 300 may be implemented with fixed logic or programmable logic (e.g., software/computer instructions executed by a processor). Moreover, the function of applying the beamforming weight vectors to the transmit signals may be performed by the same or different logic component (not shown in FIG. 2 for simplicity) that is used to perform the process 300, e.g., the controller 240.

Figure 3:
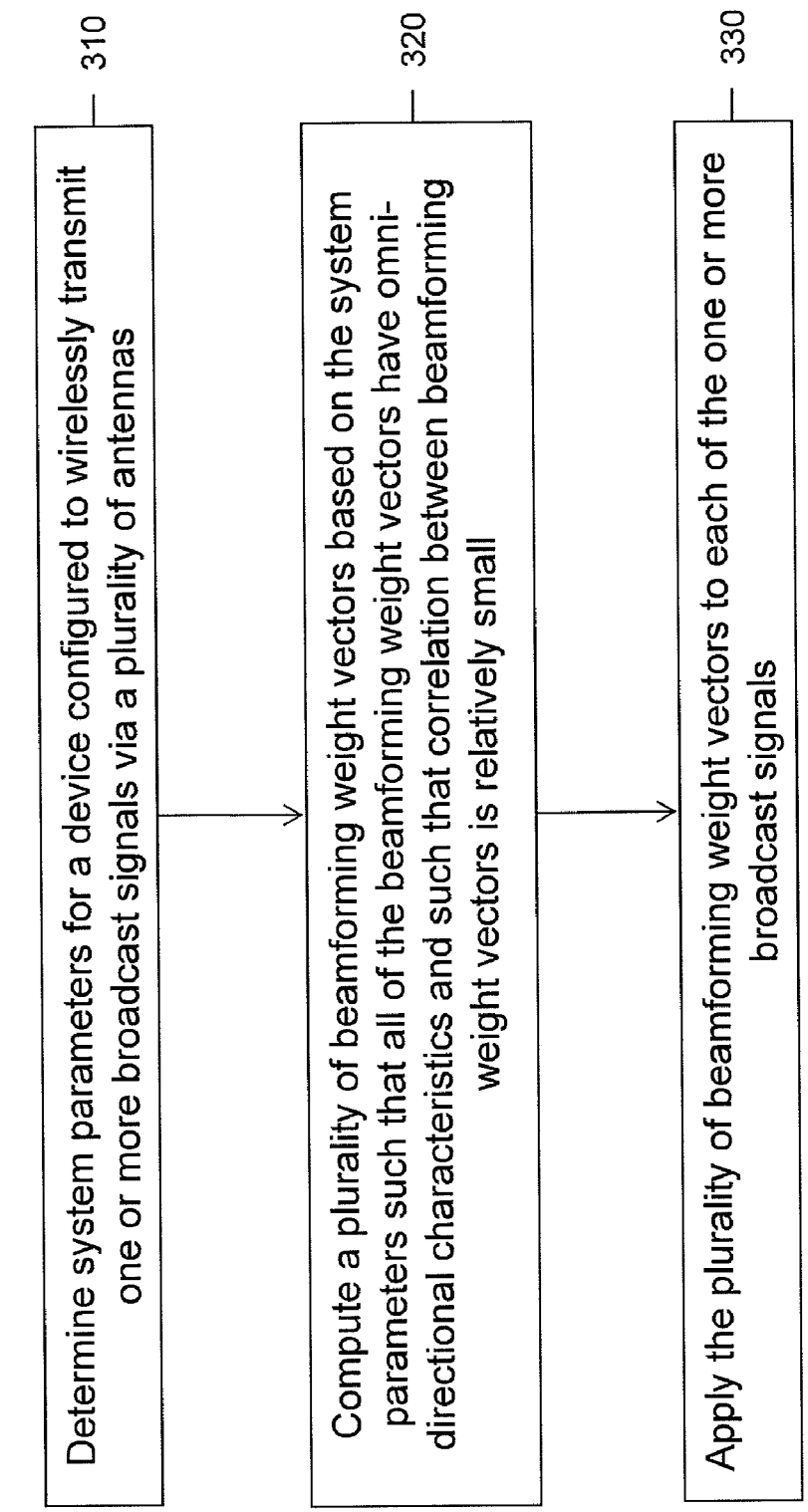
FIG. 3 is an example of a flow chart depicting the omni-directional and low-correlated pre-coding broadcast beamforming.

Turning now to FIG. 3, the omni-directional and low-correlated pre-coding broadcast beamforming process 300 is now described. Briefly, the process 300 comprises determining system parameters for a device configured to wirelessly transmit one or more broadcast signals via a plurality of antennas. A plurality of beamforming weight vectors based on the system parameters are computed such that all of the beamforming weight vectors have omni-directional characteristics and such that correlation between beamforming weight vectors is relatively low or small. Then, the plurality of beamforming weight vectors are applied to each of the one or more broadcast signals.

The process 300 is now described in more detail. At 310, system parameters for a device configured to wirelessly transmit one or more broadcast signals via a plurality of antennas are determined. The system parameters may comprise parameters such as the number of the antennas of the transmitting device (e.g., BSs 10(1)-10(3)), the spacing of the antennas, the geometry of the antennas, the number of transmit sectors into which the broadcast signals are to be beamformed, and the center carrier frequency of the one or more broadcast signals. The system parameters are used when computing values for a plurality of beamforming vectors to be applied to the one or more broadcast signals.

For example, $A(\theta, \lambda)$ is denoted to be an array steering vector (or array response vector), where $\theta$ is the angle of transmission and $\lambda$ is the carrier wavelength of the broadcast signal. As an example, for a uniform linear array (ULA), the steering vector is:

$$A(\theta, \lambda) = \begin{bmatrix} 1 & e^{j\frac{2\pi D}{\lambda}\sin(\theta)} & \ldots & e^{j\frac{2\pi D}{\lambda}(M-1)\sin(\theta)} \end{bmatrix}^T \quad (1)$$

where D is the distance between two adjacent antennas, and M is the total number of antennas. For a uniform circular array (UCA), the steering vector is:

$$A(\theta, \lambda) = \begin{bmatrix} e^{-j\frac{2\pi r}{\lambda}\cos(\theta)} & e^{-j\frac{2\pi r}{\lambda}\cos\left(\theta - \frac{2\pi}{M}\right)} & \ldots & e^{-j\frac{2\pi r}{\lambda}\cos\left(\theta - \frac{(M-1)2\pi}{M}\right)} \end{bmatrix}^T \quad (2)$$

where r is the radius of the circular array.

Next, at 320, a plurality of beamforming weight vectors are computed based on the systems parameters such that all of the beamforming weight vectors have onmi-directional characteristics and such that correlation between beamforming weight vectors is relatively low. An objective function is used to compute the beamforming weight vectors. In one embodiment the objective function is of the form:

$$w_i = \frac{1}{\sqrt{M}} \begin{bmatrix} \exp(j\beta_{i,1}) & \exp(j\beta_{i,2}) & \ldots & \exp(j\beta_{i,M}) \end{bmatrix}^T \quad (3)$$

where i is the number of beamforming weight vectors to be computed, M is the number of antennas in the base station antenna array, and $\{\beta_{i,m}\}_{m=1}^{M}$ are angles for $\beta_{i,m} \in [0, 2\pi]$.

The objective function in equation (3) is subject to constraints that the beamforming weight vectors be omni-directional and have a relatively low-correlation among them. For example, omni-directional beamforming weight vectors are subject to the constraint:

$$\frac{abs(w_i^H A(\theta_{k1}, \lambda_{DL}))}{abs(w_i^H A(\theta_{k2}, \lambda_{DL}))} \geq p_r \qquad (4)$$

for all $\theta_{k1}$ and $\theta_{k2}$, where $\theta_{k1}$ and $\theta_{k2}$ are transmission angles in the current sector, abs ( ) is the absolute value operation, and $p_r$ is the ratio of power within a given sector. The power ratio is selected to be close to one, such as $p_r$=0.8 or 0.9, in order to apply omni-directional (uniform) power within any given sector. The second constraint, that the beamforming weight vectors be low-correlated, can be expressed as follows. Given a group of L omni-directional beamforming weight vectors $\{w_1\ w_2\ \ldots\ w_L\}$, the correlation between different weight vectors, $w_{i1}$ and $w_{i2}$, is low. In other words, the correlation between two beamforming weight vectors is computed such that:

$$abs(w_{i1}^H w_{i2}) \qquad (5)$$

is small for i1≠i2, where H is the Hermitian operation. Correlation is measured on a normalized relative scale with one representing full or 100% correlation, and zero representing no or 0% correlation. The correlation may consist of components that are linear, non-linear, or a combination of both. For purposes of the example embodiments presented herein, a correlation of less than approximately 0.3 is considered relatively small or low-correlated. It one embodiment, the beamforming weight vectors are computed such that there is zero (no) correlation between them. It should be understood that the objective function in equation (3), and the constraints in equations (4) and (5) are examples not meant to be limiting, and that other objective functions and constraints may be used.

Several methods are available to compute the beamforming weight vectors. A first method involves a process by which M initial angles are chosen for the objective function in equation (3). The beamforming weight vectors are then iteratively updated subject to the omni-directional constraint in equation (4). A second method involves a coarse search of possible angles within the sectors for angles with a potentially high $p_r$ around 0.5 or 0.6, then a fine search is performed in order to find angles with a $p_r$ closer to one. A third method uses a complex (number) projection in which a fixed number of subsectors Q are chosen, e.g., Q may be 16, 32, etc. Then, fast Fourier transform or matrix inversion techniques can be applied. All of the above methods could produce a set of tens or hundreds of potential beamforming weight vectors. Then, from the potential set, beamforming weight vectors are selected that are low-correlated so as to satisfy the constraint represented by equation (5). The above methods are known to those skilled in the art and are meant to be non-limiting examples of how the computations may be performed.

In one embodiment, beamforming weight vectors may be computed for a communication system with three sectors like the one depicted in FIG. 1. A common technique used in WiMAX™ communications systems with three sectors is to choose 30 beamforming weight vectors, 10 per sector. In one embodiment, the second computation technique listed above was used to compute 10 beamforming weight vectors for one sector. The computation was based on a uniform linear antenna array with eight antennas at one BS 10. For this example, the computed beamforming weight vectors are:

$$w_1 = \begin{bmatrix} 0.3480 - 0.0627i \\ -0.1093 - 0.3362i \\ 0.0052 + 0.3535i \\ 0.2078 + 0.2860i \\ 0.2223 + 0.2749i \\ -0.0497 + 0.3500i \\ -0.0553 - 0.3492i \\ 0.3536 \end{bmatrix}; w_2 = \begin{bmatrix} 0.3536 - 0.0000i \\ -0.0000 + 0.3536i \\ -0.1092 - 0.3363i \\ 0.2018 - 0.2903i \\ 0.2018 - 0.2903i \\ -0.1093 - 0.3362i \\ 0.0000 + 0.3536i \\ 0.3536 - 0.0000i \end{bmatrix}$$

$$w_3 = \begin{bmatrix} 0.3535 + 0.0061i \\ -0.0756 + 0.3454i \\ 0.0369 - 0.3516i \\ 0.3241 - 0.1412i \\ 0.3194 - 0.1516i \\ 0.2196 - 0.2771i \\ -0.2237 + 0.2738i \\ 0.2247 + 0.2730i \end{bmatrix}; w_4 = \begin{bmatrix} 0.3536 - 0.0000i \\ -0.1093 - 0.3362i \\ 0.2158 + 0.2800i \\ 0.3496 + 0.0524i \\ 0.3357 - 0.1108i \\ 0.3362 + 0.1093i \\ -0.3478 + 0.0636i \\ -0.1093 - 0.3362i \end{bmatrix}$$

$$w_5 = \begin{bmatrix} 0.3535 + 0.0033i \\ -0.0785 - 0.3447i \\ -0.0785 - 0.3447i \\ 0.2166 + 0.2794i \\ 0.2171 + 0.2791i \\ -0.0752 + 0.3455i \\ -0.0777 - 0.3435i \\ 0.3535 + 0.0037i \end{bmatrix}; w_6 = \begin{bmatrix} 0.2078 - 0.2860i \\ 0.2493 + 0.2507i \\ -0.2864 - 0.2074i \\ -0.1093 - 0.3362i \\ -0.1093 - 0.3362i \\ -0.2864 - 0.2074i \\ 0.2493 + 0.2507i \\ 0.2078 - 0.2860i \end{bmatrix}$$

$$w_7 = \begin{bmatrix} 0.3508 + 0.0443i \\ 0.0333 + 0.3520i \\ -0.2107 - 0.2839i \\ -0.0000 - 0.3536i \\ -0.2010 - 0.2909i \\ -0.3357 - 0.1110i \\ 0.3536 - 0.0000i \\ -0.1128 - 0.3351i \end{bmatrix}; w_8 = \begin{bmatrix} 0.3491 + 0.0558i \\ 0.1093 - 0.3362i \\ -0.2896 + 0.2029i \\ -0.1042 + 0.3378i \\ -0.2867 + 0.2069i \\ -0.3536 - 0.0002i \\ 0.3362 + 0.1093i \\ -0.2627 + 0.2366i \end{bmatrix}$$

$$w_9 = \begin{bmatrix} 0.3536 - 0.0000i \\ -0.0222 - 0.3529i \\ 0.0222 + 0.3529i \\ 0.3367 + 0.1079i \\ 0.3424 + 0.0879i \\ 0.2254 + 0.2724i \\ -0.2254 - 0.2724i \\ 0.1894 - 0.2985i \end{bmatrix}, w_{10} = \begin{bmatrix} 0.3536 - 0.0000i \\ 0.1093 + 0.3362i \\ -0.2860 - 0.2078i \\ -0.1093 - 0.3362i \\ -0.2860 - 0.2078i \\ -0.3528 - 0.0224i \\ 0.3512 - 0.0405i \\ -0.1894 - 0.2985i \end{bmatrix}$$

Note each vector has dimension of eight for the eight antennas at the BS 10 in this example.

Referring once again to FIG. 3, after the beamforming weight vectors have been computed, at 330 the plurality of beamforming weight vectors are applied to each of the one or more broadcast signals to be transmitted by the BS 10. An example where the beamforming weight vectors are applied to contiguous groups of subcarrier signals in a cluster associated with the one or broadcast signals is described hereinafter in conjunction with FIG. 5.

Figure 4:
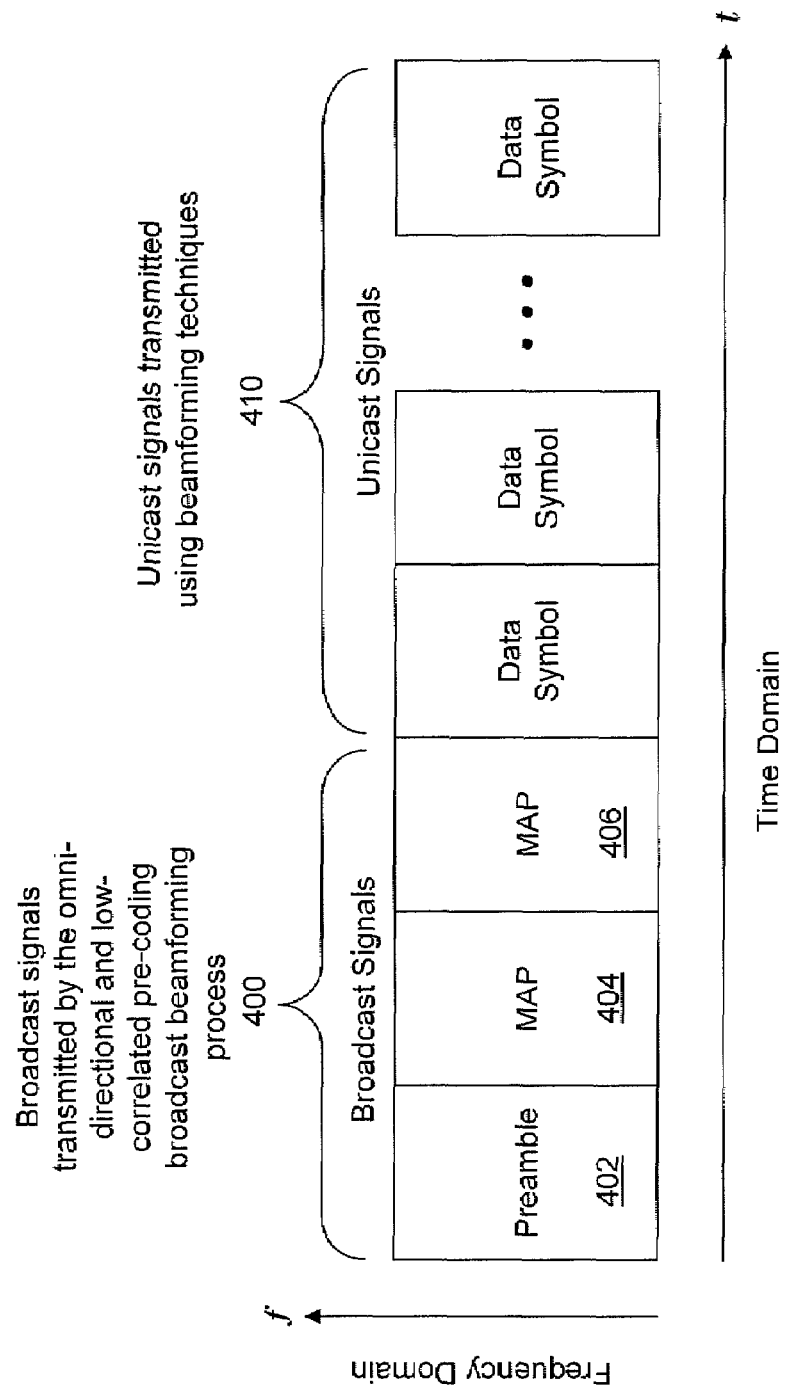
FIG. 4 is an example of application of the omni-directional and low-correlated pre-coding broadcast beamforming process to broadcast signals that form a portion of a frame.

Referring now to FIG. 4, an example of a basic frame structure for a downlink transmission is shown, such as that employed in the IEEE 802.16 communication standard. The frame comprises broadcast signals 400 and unicast signals 410 to be transmitted. The broadcast signals 400 comprise, for example, a preamble 402 and MAP packets 404 and 406. The broadcast signals 400 are transmitted using the omni-directional and low-correlated pre-coding broadcast beamforming process 300 whereby a plurality of beamforming weight vectors are computed as described and applied to each of the packets in the broadcast signals 400. The unicast signals 410 are transmitted to the intended destination device using any beamforming technique.

Figure 5:
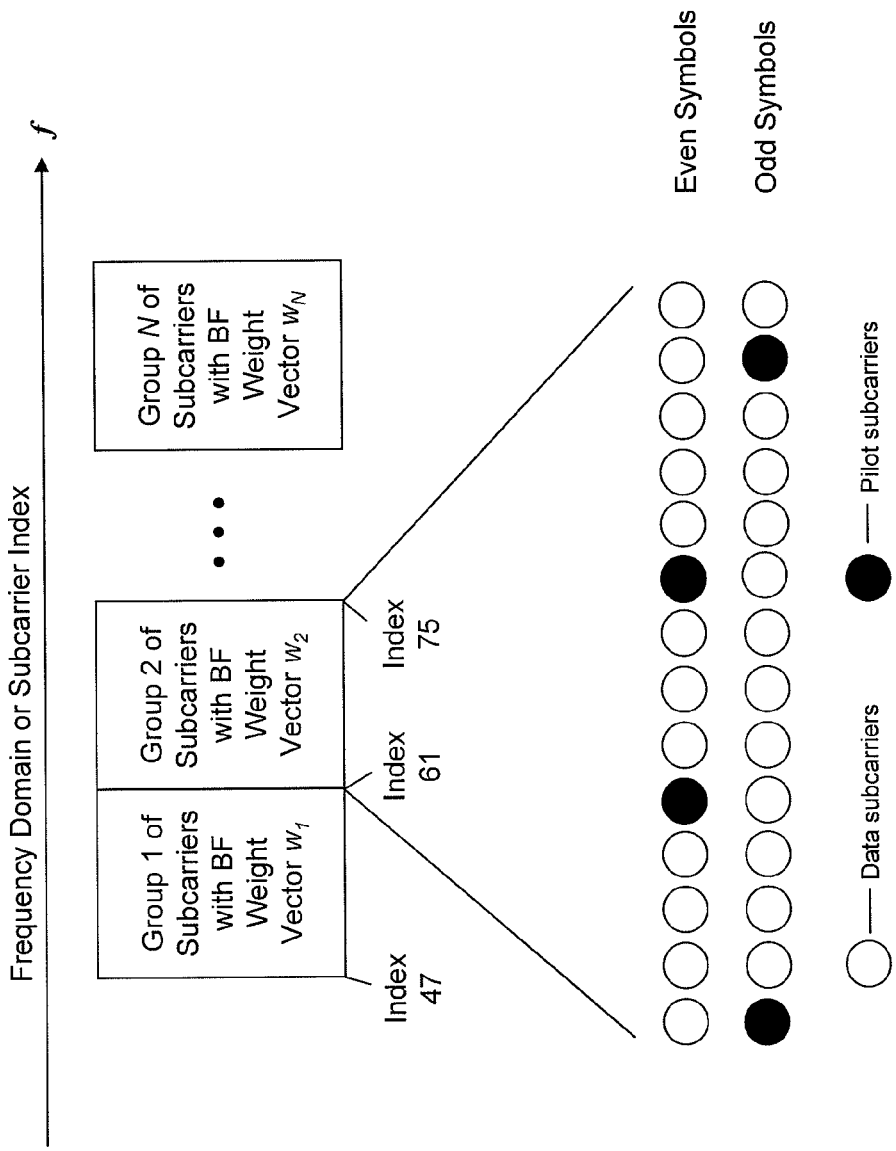
FIG. 5 is a diagram showing application of the omni-directional and low-correlated pre-coding broadcast beamforming process when transmitting contiguous groups of subcarrier signals associated with one or more broadcast signals to be transmitted.

Turning to FIG. 5, an example is shown where the broadcast signals comprise groups of contiguous subcarrier signals. For example, there are N groups of subcarriers, i.e., Group 1 to Group N. Each group comprises a predetermined number of subcarriers, e.g., 14 in the case of a WiMAX™ partially used subcarrier (PUSC) formatted signal when the fast Fourier transform (FFT) size is 512. The first group depicted is shown with a first subcarrier index at 47 and comprises subcarriers 47-60, the second group comprising subcarriers 61-74, and so on. FIG. 5 shows an example configuration of data subcarriers and pilot subcarriers for a subcarrier group. The subcarrier arrangement shown in FIG. 5 is used in the PUSC mode of the WiMAX™ communication protocol. In FIG. 5 the black (shaded) ovals represent pilot subcarriers and the white (unshaded) ovals represent data subcarriers. Once the beamforming weight vectors $w_1$-$w_N$ have been computed using techniques described herein, they are applied to the broadcast signal to be transmitted using the contiguous groups of subcarriers (clusters) such that beamforming weight vector $w_1$ is applied to the subcarriers for Group 1, the beamforming weight vector $w_2$ is applied to the subcarriers for Group 2, and so on.

Figure 6:
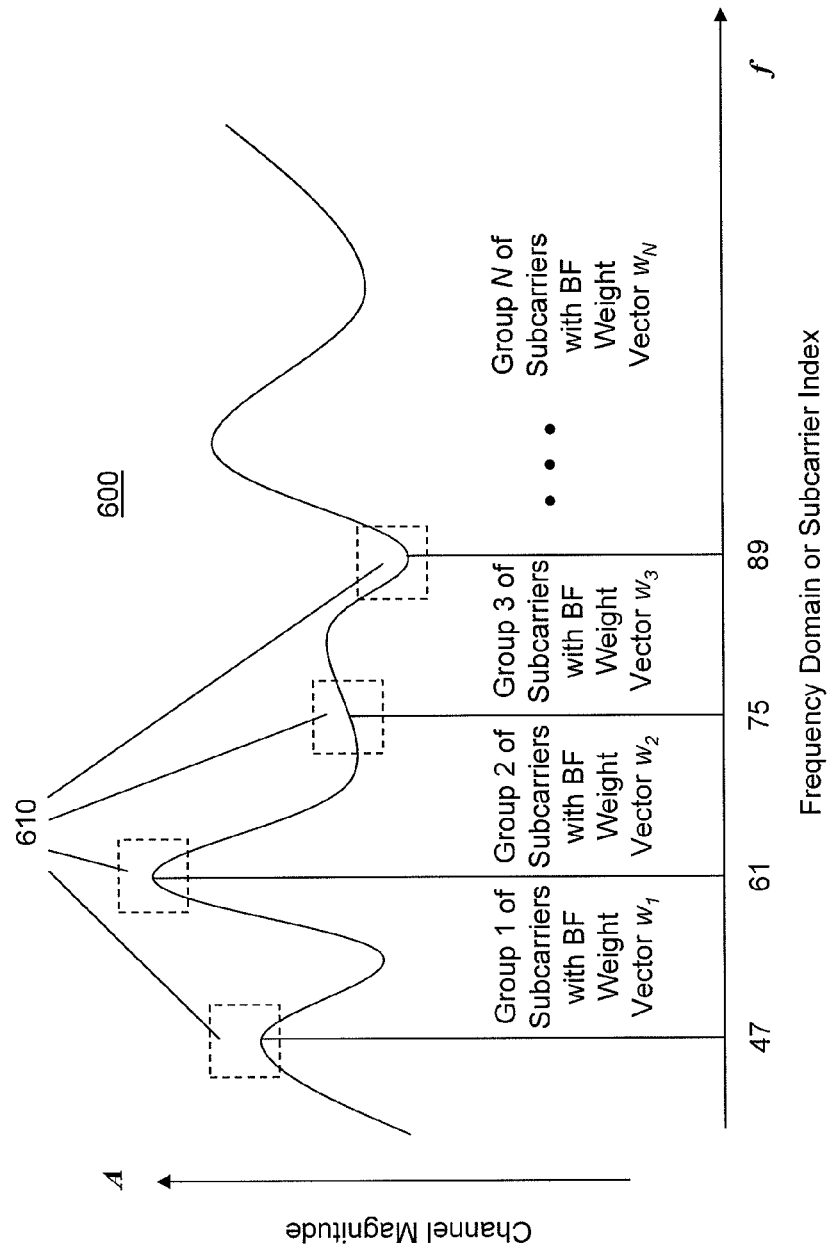
FIG. 6 is an example diagram showing a feature of the omni-directional and low-correlated pre-coding broadcast beamforming process to smooth signals resulting from application of beamforming weight vectors at boundaries of the contiguous groups of subcarrier signals.

When the beamforming weight vectors are applied to groups of contiguous subcarriers, it is possible that discontinuities in the magnitudes of the signals resulting from application beamforming weight vectors to the broadcast signals between subcarrier groups may occur. Turning to FIG. 6, a plot of signals that result from application of the beamforming weight vectors to the groups of subcarriers shown in FIG. 5 are shown at 600. The frequency domain and subcarrier indices remain the same, however FIG.6 depicts the magnitudes of the signals resulting from application of the beamforming weight vectors that are ultimately transmitted. Groups of subcarriers are depicted by subcarrier index with boundaries indicated by vertical lines. The discontinuities at the boundaries 610 between groups of subcarriers can be smoothed using a function applied when computing the beamforming weight vectors.

In one embodiment the following smoothing function can be applied when computing the beamforming weight vectors:

$$\overline{sw}_n = (w_i f(n) + w_{i+1}(1-f(n)))/\mathrm{norm}(w_i f(n) + w_{i+1}(1-f(n))) \quad (6)$$

where n is the subcarrier index in the boundary and $f(n) \in [0,1]$ is a percentage function of n, $w_i$ and $w_{i+1}$ are the beamforming weight vectors for two physically adjacent clusters or subchannels (subcarrier groups), and norm ( ) is a normalization function.

In one example embodiment in conjunction with FIG. 6, it may be advantageous to choose two (or more) subcarriers to smooth the boundary of two subcarrier groups. For example, consider the boundary between subcarrier groups 1 and 2. In this example, the beamforming weight vector $w_1$ would be applied to subcarriers 47-59. Then two smoothing weight vectors $\overline{sw}_{60}$ and $\overline{sw}_{61}$ would be computed using equation (6) for subcarrier indices 60 and 61 at the boundary of subcarrier groups 1 and 2. Beamforming weight vector $w_2$ would be applied to subcarriers 62-73 (interior subcarriers) of subcarrier group 2. Likewise, the smoothing weight vectors $\overline{sw}_{74}$ and $\overline{sw}_{75}$ are computed for the boundary of subcarrier group 2 and group 3 and so on. Finally, the set of beamforming weight vectors $\{w_1\ w_2 \ldots w_{10}\}$ and the smoothing beamforming weight vectors $\overline{sw}_n$'s (applied to the appropriate subcarriers) are used to pre-code the transmitted downlink broadcasting signals.

In another example embodiment, ten beamforming weight vectors $\{w_1\ w_2 \ldots w_{10}\}$ are applied to a PUSC MAP broadcast signal across three clusters (42 sub-carriers per beamforming weight vector). Using the beamforming weight vectors across a larger spectrum allows more subcarriers to be used in the smoothing computations. For example, if eight subcarriers are chosen to smooth the boundary of subcarrier groups, then beamforming weight vector $w_1$ is applied to interior subcarriers 47 to 84 (spanning subcarrier groups 1, 2 and 3), smoothing weight vectors $\overline{sw}_{85\text{-}92}$ are applied to boundary subcarriers 85 to 92, beamforming weight vector $w_2$ is applied to subcarriers 93 to 126 (spanning subcarrier groups 4, 5 and 6), smoothing weight vectors $\overline{sw}_{127\text{-}134}$ are applied to the boundary subcarriers 127 to 134, and so on. Again, the set of beamforming weight vectors $\{w_1\ w_2 \ldots w_{10}\}$ and smoothing weight vectors $\overline{sw}_n$'s (applied to the appropriate subcarriers) are used to pre-code the transmitted downlink broadcasting signals.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    determining system parameters for a device configured to wirelessly transmit one or more broadcast signals via a plurality of antennas;
    computing a plurality of beamforming weight vectors based on the system parameters such that all of the beamforming weight vectors have omni-directional characteristics and such that correlation between beamforming weight vectors is relatively low; and
    applying respective ones of the plurality of beamforming weight vectors to corresponding contiguous groups of subcarrier signals being associated with the one or more broadcast signals to produce beamformed transmit signals for transmission via the plurality of antennas.

2. The method of claim 1, wherein determining system parameters comprises determining the number of the plurality of antennas, the spacing of the antennas, the geometry of the antennas, the number of transmit sectors, and the center carrier frequency of the one or more broadcast signals.

3. The method of claim 1, wherein computing the plurality of beamforming weight vectors comprises computing beamforming weight vectors for a uniform linear antenna array.

4. The method of claim 1, wherein computing the plurality of beamforming weight vectors comprises computing beamforming weight vectors for a uniform circular antenna array.

5. The method of claim 1, wherein computing comprises computing the plurality of beamforming weight vectors so as to smooth the magnitude of signals from application of the beamforming weight vectors at boundaries of the contiguous groups of subcarriers.

6. The method of claim 1, wherein computing the plurality of beamforming weight vectors comprises computing:

$$w_i = \frac{1}{\sqrt{M}}[\exp(j\beta_{i,1}) \; \exp(j\beta_{i,2}) \; \ldots \; \exp(j\beta_{i,M})]^T$$

where $w_i$ is the $i^{th}$ beamforming weight vector for i=1 to M, M is the number of antennas of the device, exp( ) is an exponential function, and $\beta_{i,M}$ are angles between zero and $2\pi$.

7. The method of claim 6, wherein computing the plurality of beamforming weight vectors to achieve their omni-directional characteristics comprises computing the plurality of beamforming weight vectors such that:

$$\frac{abs(w_i^H A(\theta_{k1}, \lambda_{DL}))}{abs(w_i^H A(\theta_{k2}, \lambda_{DL}))} \geq p_r$$

where abs( ) is the absolute value function, $A(\theta_{k1}, \lambda_{DL})$ and $A(\theta_{k2}, \lambda_{DL})$ are array steering vectors, $\theta_{k1}$ and $\theta_{k2}$ are transmission angles in a sector, $\lambda_{DL}$ is the wavelength of the broadcast signals, and $p_r$ is a power ratio selected to form an omni-directional beam within a given sector.

8. The method of claim 7, wherein computing the plurality of beamforming weight vectors comprises computing the plurality of beamforming weight vectors subject to the constraint that $abs(w_{i1}^H w_{i2})$ is relatively small for $i_1 \neq i_2$.

9. An apparatus comprising:
a plurality of antennas;
a transmitter configured to transmit signals via respective ones of the plurality of antennas;
a controller coupled to the transmitter and configured to:
compute a plurality of beamforming weight vectors based on system parameters such that all of the beamforming weight vectors have omni-directional characteristics and such that correlation between beamforming weight vectors is relatively low; and
apply respective ones of the plurality of beamforming weight vectors to corresponding contiguous groups of subcarrier signals being associated with one or more broadcast signals to produce beamformed transmit signals by the transmitter via the plurality of antennas.

10. The apparatus of claim 9, wherein the plurality of antennas are configured as a uniform linear antenna array, and wherein the controller is further configured to compute the beamforming weight vectors for the uniform linear antenna array.

11. The apparatus of claim 9, wherein the plurality of antennas are configured as a uniform circular antenna array, and wherein the controller is further configured to compute the beamforming weight vectors for the uniform circular antenna array.

12. The apparatus of claim 9, wherein the controller is configured to compute the plurality of beamforming weight vectors so as to smooth the magnitude of signals resulting from application of the beamforming weight vectors at boundaries of the contiguous groups of subcarriers.

13. One or more tangible non-transitory computer readable media encoded with instructions for execution and when executed operable to:
compute a plurality of beamforming weight vectors based on system parameters associated with a device configured to wirelessly transmit one or more broadcast signals via a plurality of antennas such that all of the beamforming weight vectors have omni-directional characteristics and such that correlation between beamforming weight vectors is relatively low; and
apply respective ones of the plurality of beamforming weight vectors to corresponding contiguous groups of subcarrier signals being associated with the one or more broadcast signals to produce beamformed transmit signals for transmission via the plurality of antennas.

14. The non-transitory computer readable media of claim 13, wherein the instructions operable to compute the plurality of beamforming weight vectors is based on system parameters comprising the number of the antennas, the spacing of the antennas, the geometry of the antennas, the number of transmit sectors, and the center carrier frequency of the one or more broadcast signals.

15. The non-transitory computer readable media of claim 13, wherein the instructions operable to compute the plurality of beamforming weight vectors comprise instructions operable to compute the beamforming weight vectors for a uniform linear antenna array.

16. The non-transitory computer readable media of claim 13, wherein the instructions operable to compute the plurality of beamforming weight vectors comprise instructions operable to compute the beamforming weight vectors for a uniform circular antenna array.

17. The non-transitory computer readable media of claim 13, wherein the instructions operable to compute the plurality of beamforming weight vectors comprise instructions operable to compute the plurality of beamforming weight vectors so as to smooth the magnitude of signals resulting from application of the beamforming weight vectors at boundaries of the contiguous groups of subcarriers.

18. The apparatus of claim 9, wherein the system parameters comprise a number of the plurality of antennas, spacing of the antennas, geometry of the antennas, a number of transmit sectors, and a center carrier frequency of the one or more broadcast signals.

19. The apparatus of claim 9, wherein the controller is configured to compute the plurality of beamforming weight vectors by computing:

$$w_i = \frac{1}{\sqrt{M}}[\exp(j\beta_{i,1}) \; \exp(j\beta_{i,2}) \; \ldots \; \exp(j\beta_{i,M})]^T$$

where $w_i$ is the $i^{th}$ beamforming weight vector for i=1 to M, M is the number of antennas of the device, exp( ) is an exponential function, and $\beta_{i,M}$ are angles between zero and $2\pi$.

20. The non-transitory computer readable media of claim 13, wherein the instructions operable to compute comprise instructions operable to compute the plurality of beamforming weight vectors by computing:

$$w_i = \frac{1}{\sqrt{M}}[\exp(j\beta_{i,1}) \; \exp(j\beta_{i,2}) \; \ldots \; \exp(j\beta_{i,M})]^T$$

where $w_i$ is the $i^{th}$ beamforming weight vector for i=1 to M, M is the number of antennas of the device, exp( ) is an exponential function, and $\beta_{i,M}$ are angles between zero and $2\pi$.

* * * * *